March 6, 1934.    J. R. HAMILTON ET AL    1,950,029
FLUID CONTROLLED SYSTEM
Filed Sept. 20, 1928
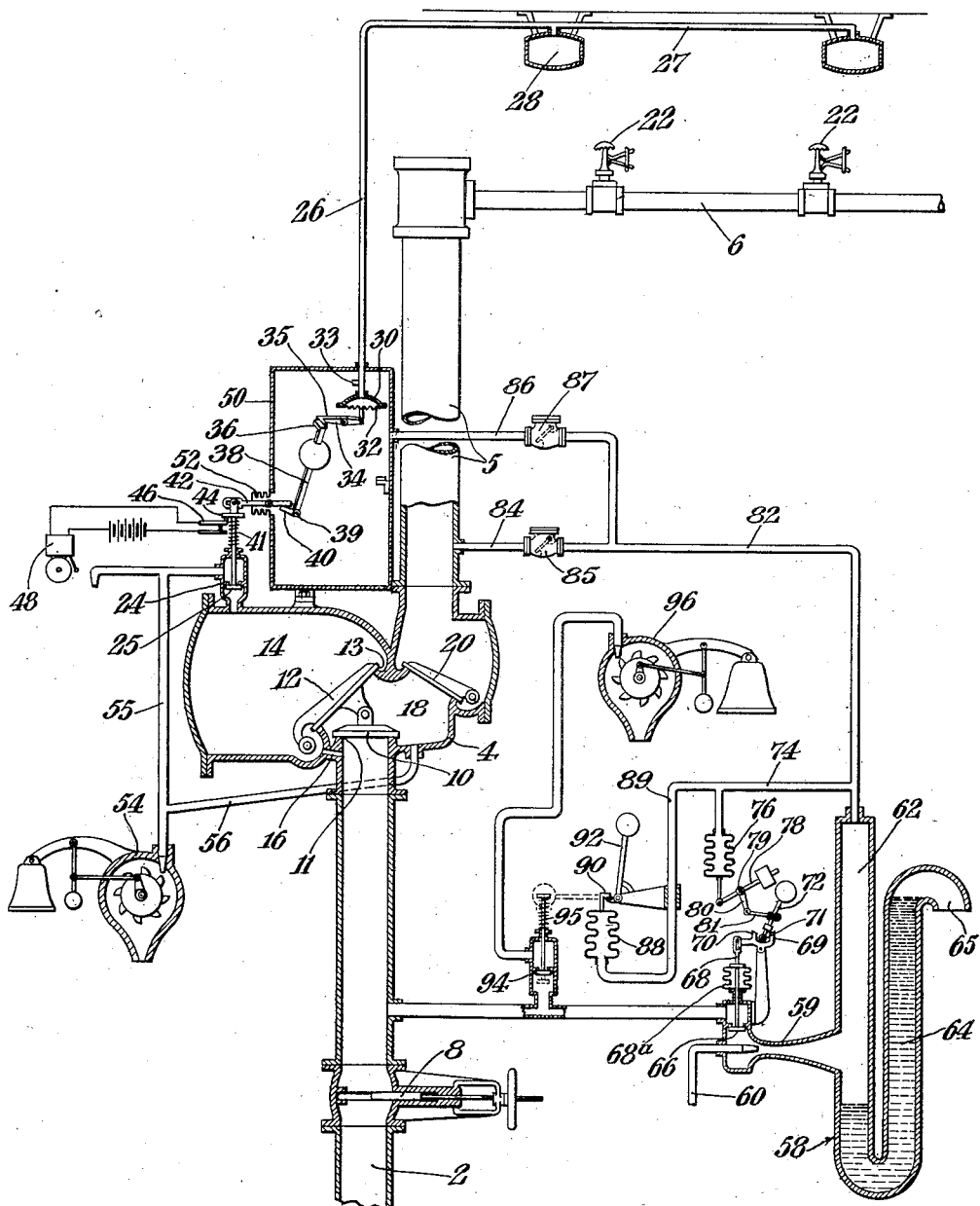
INVENTOR.
J. R. Hamilton
E. A. Lowe
BY Townsend + Decker
ATTORNEYS.

Patented Mar. 6, 1934

1,950,029

UNITED STATES PATENT OFFICE 1,950,029

FLUID CONTROLLED SYSTEM

John R. Hamilton and Ernest A. Lowe, Cleveland Heights, Ohio, assignors to Automatic Sprinkler Company of America, Cleveland, Ohio, a corporation of Delaware Application September 20, 1928, Serial No. 307,071

10 Claims. (Cl. 169—17)

This invention relates to fire extinguishing apparatus of the kind wherein the opening of the main water valve is controlled automatically by the expansion of air in heat detector units containing air and connected by piping or tubing independent of the water distributing piping and conveying increased air pressure to suitable means for automatically releasing or bringing the main valve into action.

The principal object of the invention is to provide means for indicating any break or other harmful condition whether in the piping supplied through the automatic main valve or in the controlling piping or units by which air pressure is communicated to the main valve controlling device, thus permitting such abnormal condition which would interfere with the fire extinguishing function of the apparatus to be corrected prior to the occurrence of a fire.

According to the present invention the piping for the fire extinguishing fluid is dry piping containing air under pressure and the operation of the main water supply valve is controlled automatically by means of heat detector units and supplemental air tubing containing also air under pressure, the increased pressure of air in said independent or detector tubing due to a fire being employed in connection with the pressure responsive means whereby the opening of the main valve is effected, and in connection with said system there is employed means for giving a signal or alarm automatically upon a decrease of the maintained pressure consequent upon abnormal leak or fracture of any portion of the system containing the air under pressure. By this invention not only is the automatic operation controlled by a variation of air pressure due to heat but a signal or warning is provided for breakage or other abnormal condition in the fluid supply piping or in the detector air tubing thereby permitting repair to be effected immediately.

The invention further consists in automatically maintaining the desired air pressure both in the air tubing and in the distributing piping by means of a suitable pump or compressor controlled automatically in its action by fall of the normal air pressure in either of them to bring said pressure automatically back to normal unless said fall of pressure is consequent upon or is due to breakage or abnormal leak in the system.

The drawing shows in skeleton and partial section fire extinguishing apparatus embodying the invention. 2 is the usual water main from which water is conveyed through an automatically controlled main valve 4 to the riser or main distributing pipe 5 having the usual branch or branches 6 to which are applied the usual fuse-controlled sprinkler heads 22 or other outlets adapted to open automatically by the action of heat. The gate valve 8 in the supply 2 permits the supply of water or other liquid to be discontinued when desired. The main valve 4 is shown as of the particular type wherein a clapper or valve closer 10 is normally held to its seat 11 by a second and larger disk 12 engaging a seat 13 and normally subjected to pressure of liquid in a chamber 14 supplied through a restricted opening or bypass 16 from pipe 2. The supply chamber 18 in which the valve 10 moves is normally closed from the piping 5 and 6 by means of the one-way flap valve 20 which cuts off back pressure from the pipes 5, 6, into chamber 18. This valve is readily displaceable by the fluid passing through valve 10 to the distributing piping 5, 6.

The opening of a sprinkler head 22 by the fusing of the link normally maintaining it closed permits the discharge of the fire extinguishing fluid in the usual way when and if the main valve is opened by the action of the heat detector units and the air pressure operating on the diaphragm 32. The automatic opening of the main fluid supply valve 10 is brought about on the occurrence of fire by an increase of air pressure produced in air piping 26, 27, and heat detector units or chambers 28 located in the danger zone and suitably connected with the tubing or piping 26. Means for bringing about this automatic action of the main valve by such increase of pressure may consist of any desired controlling means but as here shown comprise a flexible controlling diaphragm 32 operating by such increase of pressure upon a pivoted latch 34 connected by a link with the diaphragm and having an extension 35 suitably formed to engage and hold the end of the weighted lever 38 pivoted at 39 in lifted position while the pressure in 26 and on the diaphragm is at normal. The engaging parts are so formed that upon movement of the latch 34 in either direction due to increase or decrease of such normal pressure upon the diaphragm they will disengage the weighted lever 38. Said lever in falling lifts by its projection 40 a lever 42 which in turn is pivotally connected to the upper end of the valve rod 24 carrying the valve member 25 normally held in elevated position by means of the spring 41. The valve stem 24 carries a suitable collar 44 or other means for actuating the switch lever 46 to cause the operation of a suitable signalling means herein indicated as an electric bell 48.

The tubing 26 terminates in the casing 30 across the face of which the flexible controlling diaphragm 32 is secured and an air-tight housing 50 encloses the parts as shown. Motion of lever 42 without escape of air pressure is permitted by the usual flexible diaphragm 52 in which the lever 42 is mounted. A restricted leak 33 is provided within the casing 50 from or into the air piping or tubing 26 to permit equalization of the pressures upon small changes of pressure at a comparatively slow degree so that the diaphragm will be ineffective excepting upon the large and more rapid increases of pressure in tubing 26 consequent upon the heating of the units 28 by fire and operating to expand the diaphragm or upon extreme relief of pressure due to breakage of the air tubing 26, 27 or a detector unit 28 or an abnormal leakage in such portion of the system rendering it inoperable as the fire detecting unit, such relief of pressure permitting the diaphragm 32 to rise and thereby release lever 38.

It will thus be understood that any movement of the diaphragm 32 upward consequent upon a sudden relief of pressure in the tubing 26 or unit 28 uncompensated by the entrance of air from chamber 50 through the leak 33 into tubing 26 will cause the bell 48 as well as the water-operated bells to sound thus giving warning of a breakage or leakage in the detector tubing and its adjuncts requiring attention in order that the device may be repaired or put in normally operable condition.

The opening of the main valve 4 ensues upon opening of the discharge valve whose movable valve portion 25 is carried by rod 41, since said valve 25 opens the connection between the chamber 14 wherein a bypass pressure of liquid is normally maintained and the outlet or discharge pipe 55, thereby relieving the pressure by which the main valve is held closed against the pressure in pipe 2 tending to unseat it. Liquid escaping by pipe 55 may operate upon a gong-ringing motor 54 thus also giving an alarm when the pressure in 26 is abnormally decreased or impaired as well as giving a signal indicating the operation of the main valve in the normal automatic actions. An additional means for indicating operation of the main valve may be provided by the use of motor operating liquid supplied through pipe 56 from the chamber 18.

The system of distributing tubing 5, 6, as well as the heat detector air tubing and detectors 26, 27, 28 normally contain air under a substantially constant normal pressure automatically maintained as will be presently described. This may be a relatively light pressure, approximately two pounds per square inch being sufficient. Upon any injury occurring to the supply pipes or the system of tubing such pressure will serve as a supervising agency in both the tubing and supply pipes for indicating any dangerous condition therein. The means for indicating by bell 48 a rupture or abnormal leakage in the detector tubing 26 through abnormal drop of pressure due to breakage or leakage in said detector tubing and segments has been already described. The means for automatically maintaining the air pressure in the distributing piping 56 as well as in the piping 26, 27 and heat units 28 and the means for indicating a rupture or abnormal leakage in the distributing piping 5, 6, or accidental breakage of the sprinkler heads or outlets 22 will be now described.

A suitable air pressure supply pipe 82 connects on the one hand through 84 and one-way valve 85, with the fluid distributing piping 5, 6, and on the other hand with a suitable air pump or compressor which is automatically called into action on fall of the air pressure in said distributing tubing and air piping below the normal desired maintained pressure. Said air supply pipe 82 also connects through pipe 86 and the one-way flap or check valve 87 with the chamber 50 for applying air to the detector tubing and heat units 26, 28. These automatic check valves 85, 87, permit the passage of the air or other pressure to the pipes 5, 6, and chamber 50 but prevent the escape of air from chamber 50 into pipe 82 or the flow of fire extinguishing fluid from pipe 6 back to 82 from which latter it could pass to the air pump directly or through valve 87 to the chamber 50 and detector tubing 26.

The air supply pump or compressor and the means for automatically bringing the same into action to maintain the normal desired pressure in the piping 5, 6, and air tubing 26, may be constructed in any desired way. Suitable means for this purpose are as follows:

The particular air pump shown is of the inspirator type and has the vertically arranged air chamber 62 connected with the piping 82 and with a liquid chamber or standpipe 64 having discharge outlets 65. The inspirator pump operates by Venturi action of liquid under pressure admitted through the restricted pipe 59 into chamber 62 and having the air inlet 60 arranged opposite the mouth of the Venturi section 59. The air inlet 60 is provided with a check valve of any suitable construction to prevent escape of pressure in 62 as usual in the art. The operating liquid is admitted through valve 66 and is supplied from any suitable source as indicated, as for instance, from pipe 2 under pressure. It will be understood that on the passage of fluid inwardly through the openings 59, air will be drawn with the liquid into the chamber 62 and due to lightness of the air the latter will fill the upper portion of the chamber 62 as the liquid passes outwardly through the chamber 64 and discharge openings 65. The relative difference between the head of liquid in the standpipe 64 and chamber 62 produces the pressure required within the system. It will be understood that the pressure can be varied by changing the proportion of the chambers 62 and 64.

The automatic action of the inspirator or pump is brought about by the following or other suitable means which cause the normally closed valve 66 to open. The stem 68 for the valve 66, sealed by the diaphragm 68a or otherwise, is controlled by the pivoted lever 69 formed with the projections 70 and 71 engageable by a weighted pivoted lever 72 when the latter is moved respectively to one side or the other of its pivot. The connection between the lever 69 and valve rod 68 may be a pin and slot connection in order to give a sudden movement to the valve 66.

The weighted lever 72 is controlled in its movement by the pressure within the chamber 62 and pipe 82 which pressure is transmitted through suitable tubing 74 to the flexible diaphragm 76 connected to one end of the weighted lever 78 pivoted as indicated at 79. The lever 78 is formed with the rigid projection 80 pivoted to the link 81 which is in turn connected to the lever 72 preferably by the means of a pin and slot connection.

It will be understood that a decrease or increase in pressure in the chamber 62 and pipe 82 connected to the distributing piping and heat detector or valve controlling piping so as to feel the changes of pressure therein will be transmitted to the relatively sensitive diaphragm 76 thus controlling the position of the weighted levers 72 and 78. Movement of the lever 72 to the right as shown in the present figure maintains the valve 66 closed. A reverse movement of the lever 78, under the influence of its weight due to a decrease of pressure in the tubing 74 rocks the lever 72 about its pivot to an extent such that it passes dead center whereupon the lever 72 falls against the projection 70 and causes the opening of the valve 66. The reverse action takes place as the pressure is built up to normal.

The normal pressure produced by the pump and maintained in the pipes normally holds the diaphragm or collapsible member 76 distended but on decrease of the pressure below the normal to a predetermined amount the said diaphragm or bellows device collapses and brings about the opening of the valve 66 whereupon the pump acts to produce air pressure until said pressure is built up to normal thereby distending the member 76. In order to give a suitable warning if the air pressure within the system should fall below a predetermined or normal pressure which it is desired to maintain therein by the automatic action of the pump, a pressure responsive device responsive only to a decrease of pressure below that which brings the pump into operation through the controlling action of the relatively sensitive diaphragm 76 and valve 66 is employed. For this purpose a similar collapsible and expansible member 88 may be used which is normally held distended by the pressure communicated thereto from the pipe 82 but is of sufficient stiffness to collapse only when the pressure falls still further or below that which by acting in the bellows arrangement 76 causes the pump to begin to operate. Said diaphragm or bellows arrangement 88 may be connected by tubing 89 and 74 with the pressure line 82. The diaphragm 88 carries at the movable end thereof a projection 90 engaged with the offset projection formed on the weighted lever 92 normally when the latter is in its upright position just past the dead center point and in position to be operated by a predetermined decrease in pressure of the diaphragm 88.

The lever 92 is designed to actuate the valve 94 formed with the valve stem 95 engageable by the said lever, the valve 94 serving when depressed and actuated to admit a limited flow of fluid to the fluid motor 96 for actuating a suitable alarm. It will be understood that any other suitable type of alarm may be substituted for that shown.

The operation of the apparatus will be readily understood from the above description. A certain pressure is normally maintained in the supply pipes 5, chamber 50 and system of tubing 26 and 27. If at any time the pressure in the system should fall below that desired the relatively sensitive diaphragm 76 would collapse permitting the weight 78 thereof to operate the lever 72 which in turn would cause the valve 66 to be opened and produce a flow of fluid for the inspirator 58. This operation normally replenishes the air supply in the chamber 62 and increases the head of liquid in the standpipe 64 and chamber 62 to the normal amount whereupon the bellows 76 again expands and moves the lever 72 to its right hand position as shown in the drawing thus causing the closing of the valve 66.

If the pressure within the system should fall to a still further extent in spite of the operation of the inspirator a further decrease in the pressure therein would cause the collapse of the bellows 88 and the consequent movement of the lever 92 to the left into engagement with the valve stem 95 thus sounding the alarm 96.

It will be understood that upon any injury to the supply pipes 5 and 6 such as the removal or injury to one of the sprinkler heads 22 the inspirator 58 would first be actuated and if the leak produced were sufficiently serious the alarm 96 would then be caused to sound so that the defect could be remedied.

Injury to the piping 5, 6, or removal or breakage of a sprinkler head resulting in loss of air pressure would not cause escape of air and reduction of pressure from chamber 50, detector tubing and adjuncts owing to the action of the automatic valve 87 which would close upon the reduction of pressure behind it.

Hence the injury to the piping 5—6 or the destruction of the sprinkler head would not result in a passage of fluid to the pipes 5 and its discharge in the protected area it being assumed at this time that there is no fire condition resulting in the operation of the main valve through the heat detector tube although a signal would be given indicating injury or removal of a vital portion of the system, to wit: pipe 5—6 or sprinkler head. It will be seen therefore that any break in the piping system 5—6, although the warning signal thereof will be given, will not cause the pipes to fill with the fire extinguishing fluid.

If any substantial leak should occur in any portion of the heat detector tube system 26 and 27 or chambers 28 and this leak were sufficiently large that it could not be accommodated by the restricted opening 33 the diaphragm 32 would be caused to move inwardly into its housing 30 due to the superior pressure within the chamber 50. Movement of the diaphragm 32 would release the weighted lever 38 and cause the alarm 48 to sound. Said movement would also cause the main supply valve to open but the fire extinguishing fluid passing the valve would be prevented from entering pipe 82 and detector tubing by the automatic actions of valve 85. The opening of the main supply valve 10 would cause the passage of fluid to a certain extent into the supply pipes 5 and 6 and would likewise cause the actuation of the alarm 54. The pressure responsive device consisting of the collapsible and expansible member 88 controlling the signal 96 also, as will be seen, constitutes a means supplemental to the diaphragm or pressure responsive device 32 and its control devices whereby a signal may be given in case of breakage or leakage in the detector tubing 26 since the said device 88 is connected by the tubing as described with the air-tight casing 50 and with the detector tubing 26 through the vent 33 so that if there should be any failure in the sounding of the signal 48 on relief of pressure on diaphragm 32 a signal will nevertheless be given on the alarm 96 by the supplemental pressure responsive control means 88 and its controlled devices.

It will thus be seen that the air pressure within the system serves as a supervising agency for indicating any serious break in any portion of the system. This is accomplished without sacrificing any of the real purposes of the automatic sprinkler and alarm system in that the occurrence of a fire condition in any of the protected areas produces an expansion of the fluid within the chambers 28 and tubes 27 and 26, such expansion resulting in a movement of the diaphragm 32 outwardly away from its housing 30 thus releasing the weighted lever 38 for opening of a main supply valve 10 and producing an actuation of the alarms 54 and 48.

If any injury should occur to the fluid pipes or to the indicating and controlling system of tubing such injury would be accomodated by the inspirator if of relatively small or insignificant proportion but if sufficient to require attention a suitable alarm would be given and/or the main valves supplying fire extinguishing fluid would be opened.

What is claimed is,

1. In a fire control system, normally dry fire extinguishing pipes containing air at a predetermined pressure, a fire detector system of tubing containing an actuating medium, a valve controlling the admission of a fire extinguishing medium to the pipes and subject to the control of a rapid increase of pressure in the fire detector tubing, means for automatically maintaining a substantially constant normal pressure other than atmospheric pressure in said pipes and tubing, and indicating means responsive to an abnormal drop in pressure in either said pipes or said tubing.

2. In a fire control system, normally dry fire extinguishing pipes, a fire detector system of tubing containing an actuating medium such as air, a valve controlling device subject to the control of rapidly increased pressure in said tubing, means for maintaining substantially the same pressure other than atmospheric pressure in said pipes and tubing, means responsive to a predetermined change in pressure in either said pipes or said tubing for indicating such change in pressure.

3. In a fire control system, normally dry fire extinguishing pipes, valve mechanism for the same, a system of fire detector tubing containing an actuating medium, means responsive to the action of said medium due to sudden change of pressure therein for bringing the valve mechanism into operation, means for automatically maintaining substantially the same pressure other than atmospheric pressure in said pipes and tubing, means responsive to a predetermined change in pressure in either said pipes or said tubing for indicating such change in pressure, and means for preventing the passage of fluid from said pipes toward said pressure maintaining means.

4. In a fire control system, normally dry fire extinguishing pipes, a valve controlling the admission of the fire extinguishing medium thereto, a system of fire detector tubing containing an actuating medium automatically maintained at a substantially constant pressure, means for maintaining a substantially constant normal pressure other than atmospheric pressure in said pipes and tubing, means responsive to a sudden change in pressure in said tubing for actuating said valve indicating means, and means responsive to a change in pressure in said supply pipes substantially below the desired normally maintained pressure and resulting from breakage or abnormal leak for bringing said indicating means into action.

5. In an automatic fire extinguishing system, a dry distributing piping for a fire extinguishing medium and supplemental air piping, a main valve controlling admission of the fire extinguishing medium to the main pipe, pressure responsive means responsive to rapid change of air pressure in said supplemental piping developed by fire in the area of fire protection and controlling the action of the main valve, means for maintaining a substantially constant normal air pressure other than atmospheric pressure in both said pipings, means for bringing said pressure maintaining means into action upon a predetermined decrease of air pressure in either of them and means for giving an alarm automatically upon a decrease of the pressure in either of them to a predetermined degree below that which normally brings the said air maintaining device into action.

6. In a fire extinguishing apparatus, fire detector tubing containing air at a maintained pressure, distributing piping also containing air at a maintained pressure, and a valve controlling admission of fire extinguishing fluid to the latter piping and means responsive to increase of air pressure in the detector tubing and developed by heating of the air in the fire area for controlling the action of said valve, combined with means common to the tubing and piping for supplying air under pressure thereto and means responsive to a diminution of the pressure in either of them for automatically bringing the air supply means into action.

7. In a fire extinguishing system, a main dry pipe and a supplemental detector air tubing combined with means for supplying air to both of them automatically upon a decrease of a predetermined normal pressure in them and automatic check valves in the connections leading respectively to said piping and tubing.

8. An automatic fire extinguishing apparatus or system having a piping for fire extinguishing fluid containing air under pressure and provided with a main water valve controlled in its operation automatically, combined with heat detector units connected by independent piping with pressure responsive means for effecting the opening of the main water valve upon increase of the normal pressure acting on said means and developed by heat conditions in the fire area or area of fire protection, means common to said pipings for automatically maintaining air at a substantially constant normal pressure therein and an automatic check valve between the piping for the extinguishing fluid and the air pressure maintaining means.

9. Fire extinguishing apparatus of the character specified in claim 8 in which said means for automatically maintaining air pressure in said pipings comprises an air pump or compressor for maintaining the substantially constant normal pressure in said pipes and tubing and means for automatically bringing the air pump or compressor into action upon a decrease of the normal pressure in either of them.

10. In an automatic fire extinguishing apparatus having a piping for fire extinguishing fluid containing air under normal constantly maintained pressure and provided with an automatically controlled main fluid valve combined with heat detector units connected by independent piping with pressure responsive means responsive to increase of air pressure acting thereon and developed in said heat detector units for effecting the opening of said valve said units and piping also containing air at a normal constantly maintained pressure, means common to said pipings for maintaining said pressure, means for automatically bringing said pressure maintaining means into action upon a decrease of the pressure in either of them and means for giving a warning signal indicating a drop of pressure in either of them due to abnormal leak or breakage.

JOHN R. HAMILTON.
ERNEST A. LOWE.